US009956999B2

(12) United States Patent
Crane et al.

(10) Patent No.: US 9,956,999 B2
(45) Date of Patent: *May 1, 2018

(54) WINDSHIELD WIPER MODULE (71) Applicant: Magna International Inc., Aurora (CA)

(72) Inventors: Michael William Crane, Oakland Township, MI (US); Brian Christopher Sansoterra, Clawson, MI (US); Norman Guschewski, Rochester, MI (US)

(73) Assignee: Magna International Inc., Aurora (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/182,184

(22) Filed: Jun. 14, 2016

(65) Prior Publication Data
US 2016/0288775 A1    Oct. 6, 2016

Related U.S. Application Data (63) Continuation-in-part of application No. 14/606,302, filed on Jan. 27, 2015, now Pat. No. 9,738,262, which
(Continued)

(51) Int. Cl.
*B62D 35/00* (2006.01)
*B60S 1/04* (2006.01)
(Continued)

(52) U.S. Cl.
CPC ......... *B62D 35/007* (2013.01); *B60Q 1/2684* (2013.01); *B60Q 1/302* (2013.01);
(Continued)

(58) Field of Classification Search
CPC ..... B62D 35/007; B60Q 1/2684; B60S 1/043; B60S 1/0433; B60S 1/0438; B60S 1/0441;
(Continued)

(56) References Cited

U.S. PATENT DOCUMENTS 1,518,058 A   12/1924   Folberth et al.
1,886,812 A   11/1932   Hueber et al.
(Continued)

FOREIGN PATENT DOCUMENTS

DE       3206173 A1    8/1983
DE   102008026131 A1   12/2008
(Continued)

OTHER PUBLICATIONS

International Search Report for International Application No. PCT/US2012/047612, Filed Jul. 20, 2012.

*Primary Examiner* — Hilary L Gutman
(74) *Attorney, Agent, or Firm* — Warn Partners, P.C.

(57) ABSTRACT

A wiper module assembly for a vehicle lift gate having an inner panel with a spoiler formed as a one-piece part of an outer panel. The outer panel of the lift gate is connected to the inner panel to form an exterior surface of the lift gate. A cavity is formed in part of the spoiler and receives a carrier forming a removable module connected to the cavity of the vehicle lift gate. The carrier includes a wiper, motor and drive assembly for operating a wiper for a window on the lift gate.

19 Claims, 11 Drawing Sheets

Related U.S. Application Data is a continuation-in-part of application No. 14/232,966, filed as application No. PCT/US2012/047612 on Jul. 20, 2012, now Pat. No. 8,973,968.

(60) Provisional application No. 61/572,831, filed on Jul. 22, 2011.

(51) Int. Cl.
*B60S 1/58* (2006.01)
*B60Q 1/26* (2006.01)
*B60Q 1/30* (2006.01)
*B60J 5/10* (2006.01)

(52) U.S. Cl.
CPC ............. *B60S 1/0433* (2013.01); *B60S 1/583* (2013.01); *B60J 5/102* (2013.01)

(58) Field of Classification Search
CPC ...... B60S 1/0447; B60S 1/045; B60S 1/0452; B60S 1/0491; B60S 1/0497; B60S 1/58; B60S 1/583; B60S 1/60
USPC ....................................................... 296/96.17
See application file for complete search history.

(56) References Cited

U.S. PATENT DOCUMENTS

| | | | |
|---|---|---|---|
| 1,899,812 A | 2/1933 | Knapp | |
| 1,923,342 A | 8/1933 | Ranst | |
| 2,040,966 A | 5/1936 | Westrope | |
| 4,310,943 A * | 1/1982 | Palma | B60S 1/0402 15/250.01 |
| 4,756,568 A * | 7/1988 | Yamamoto | B60S 1/0405 15/250.16 |
| 5,415,453 A * | 5/1995 | Huber | B60S 1/0402 15/250.16 |
| 5,504,966 A | 4/1996 | Lee et al. | |
| 5,771,526 A | 6/1998 | Burton | |
| 5,799,358 A | 9/1998 | Unverrich | |
| 6,123,384 A | 9/2000 | Eustache et al. | |
| 6,270,142 B1 | 8/2001 | Danielsen | |
| 6,637,801 B1 | 10/2003 | Eustache et al. | |
| 7,144,065 B2 * | 12/2006 | McClure | B60J 5/101 292/341.15 |
| 7,364,330 B2 | 4/2008 | Nahm et al. | |
| 7,600,803 B2 * | 10/2009 | Lipps | B60S 1/0444 15/250.31 |
| 7,618,083 B2 | 11/2009 | Munenaga et al. | |
| 7,708,335 B2 * | 5/2010 | Wegener | B60T 1/16 296/180.1 |
| 7,780,214 B2 * | 8/2010 | Kraus | B60S 1/0444 296/96.15 |
| 7,832,791 B2 * | 11/2010 | Wojcik | B60J 5/101 15/250.3 |
| 7,895,703 B2 | 3/2011 | Ina et al. | |
| 8,020,247 B2 | 9/2011 | Katou et al. | |
| 8,104,134 B2 * | 1/2012 | Ritt | B60S 1/0447 15/250.3 |
| 8,214,965 B2 * | 7/2012 | Volz | B60S 1/0441 15/250.3 |
| 8,327,495 B1 | 12/2012 | Martinez | |
| 8,585,118 B2 | 11/2013 | Kileen | |
| 8,764,092 B2 | 7/2014 | Webb et al. | |
| 8,770,647 B2 * | 7/2014 | Ko | B60S 1/0438 15/250.31 |
| 8,973,968 B2 | 3/2015 | Crane et al. | |
| 9,487,186 B2 * | 11/2016 | Ju | B60S 1/0447 |
| 2002/0086587 A1 | 7/2002 | Buchanan, Jr. | |
| 2004/0124664 A1 * | 7/2004 | McClure | B60J 5/101 296/146.8 |
| 2007/0011839 A1 * | 1/2007 | Princet | B60S 1/583 15/250.31 |
| 2007/0076418 A1 | 4/2007 | Nahm et al. | |
| 2007/0200389 A1 | 8/2007 | Ina et al. | |
| 2008/0030047 A1 | 2/2008 | Munenaga et al. | |
| 2008/0284204 A1 * | 11/2008 | Wojcik | B60J 5/101 296/180.1 |
| 2015/0258969 A1 | 9/2015 | Crane et al. | |

FOREIGN PATENT DOCUMENTS

| | | | |
|---|---|---|---|
| FR | 2796915 A1 | 2/2001 | |
| JP | 2003506242 A | 2/2003 | |
| JP | 3118410 U * | 1/2006 | ............ B60S 1/3806 |
| JP | 2007253927 A | 10/2007 | |
| JP | 2008062810 A | 3/2008 | |
| JP | 2009067360 A | 4/2009 | |
| JP | 2009196478 A | 9/2009 | |

* cited by examiner

WINDSHIELD WIPER MODULE

CROSS-REFERENCE TO RELATED APPLICATION

This application is a Continuation-in-Part of U.S. patent application Ser. No. 14/606,302, filed Jan. 27, 2015, which is a Continuation of U.S. patent application Ser. No. 14/232,966, filed Jan. 15, 2014, which is the National Phase of PCT Application No. PCT/US2012/047612, filed Jul. 20, 2012, which claims priority from U.S. Provisional Application No. 61/572,831 filed Jul. 22, 2011.

FIELD OF THE INVENTION

The present invention relates to a wiper module assembly which is a separate component from a spoiler, lift gate, or other vehicle component, and is removable such that repairs to the wiper module assembly can be achieved without the disassembly or removal of the spoiler.

BACKGROUND OF THE INVENTION

Lift gates are commonly used on crossover vehicles and sport utility vehicles, instead of a trunk. These lift gates typically have a window, which serves as the rear window of the vehicle. Different designs and styling often incorporate the use of a spoiler mounted to the top of the lift gate, and more specifically, across the top of the window.

These lift gates also use some type of a windshield wiper which is mounted to the lift gate to clear the rear window during inclement weather conditions.

However, many design requirements of lift gates require that the windshield wiper be hidden from view to achieve the desired styling. Many attempts to achieve this have involved designing the lift gate to be made of multiple components, which must be removed when the windshield wiper needs to be serviced.

Accordingly, there exists a need for a lift gate which has a spoiler designed in such a manner that the windshield wiper may be serviced and removed without disassembling the spoiler.

SUMMARY OF THE INVENTION

The present invention is directed to a wiper module assembly for a vehicle lift gate having a one-piece outer panel with a spoiler formed as part of the outer panel, where the one-piece outer panel forms an exterior surface of the lift gate. An inner panel of the lift gate is connected to the outer panel to form an interior surface of the lift gate to which components such as brake lights and turn signal lights, modules, latches, locks, windows and interior finish components are mounted. A cavity is formed in part of the spoiler and receives a carrier forming a removable module connectable to the cavity of the vehicle lift gate. A motor is connected to the carrier and has a drive assembly driven by the motor. A spindle rotatably extends from and is driven by the drive assembly. A wiper is connected to the spindle and moves between a retracted position and an extended position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-10 and 13-14, generally, a lift gate assembly 10 is generally shown. The lift gate assembly 10 in accordance with the present embodiment of the invention provides a wiper module assembly 14 connected to a spoiler 11, which is part of a lift gate 16 of the lift gate assembly 10 for a vehicle. The wiper module assembly 14 has a wiper 24 that operates to wipe a rear window 26 that is part of the lift gate assembly 10.

Figure 1:
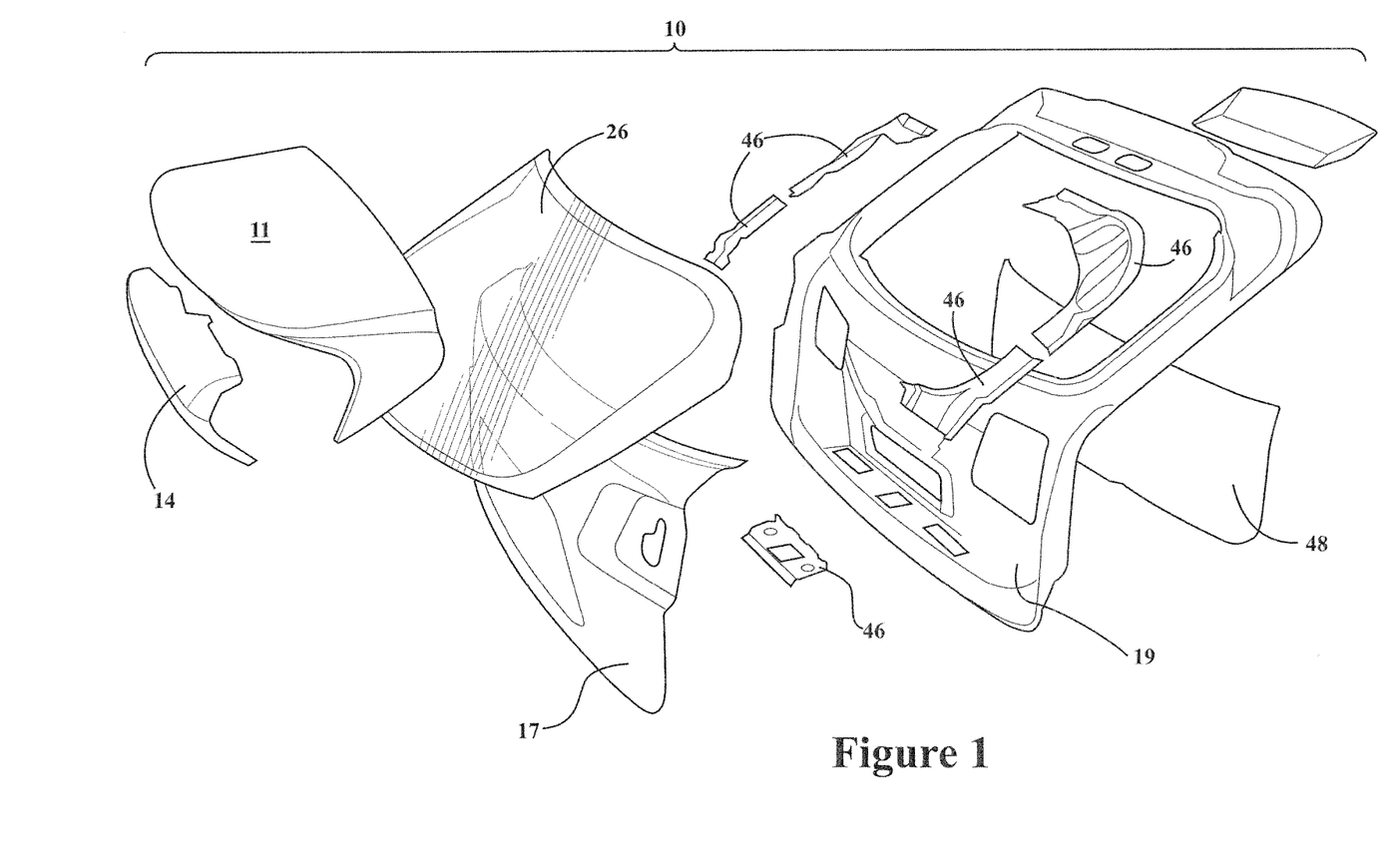
FIG. 1 is an exploded perspective view of a lift gate in accordance with one aspect of the present invention.
Figure 2:
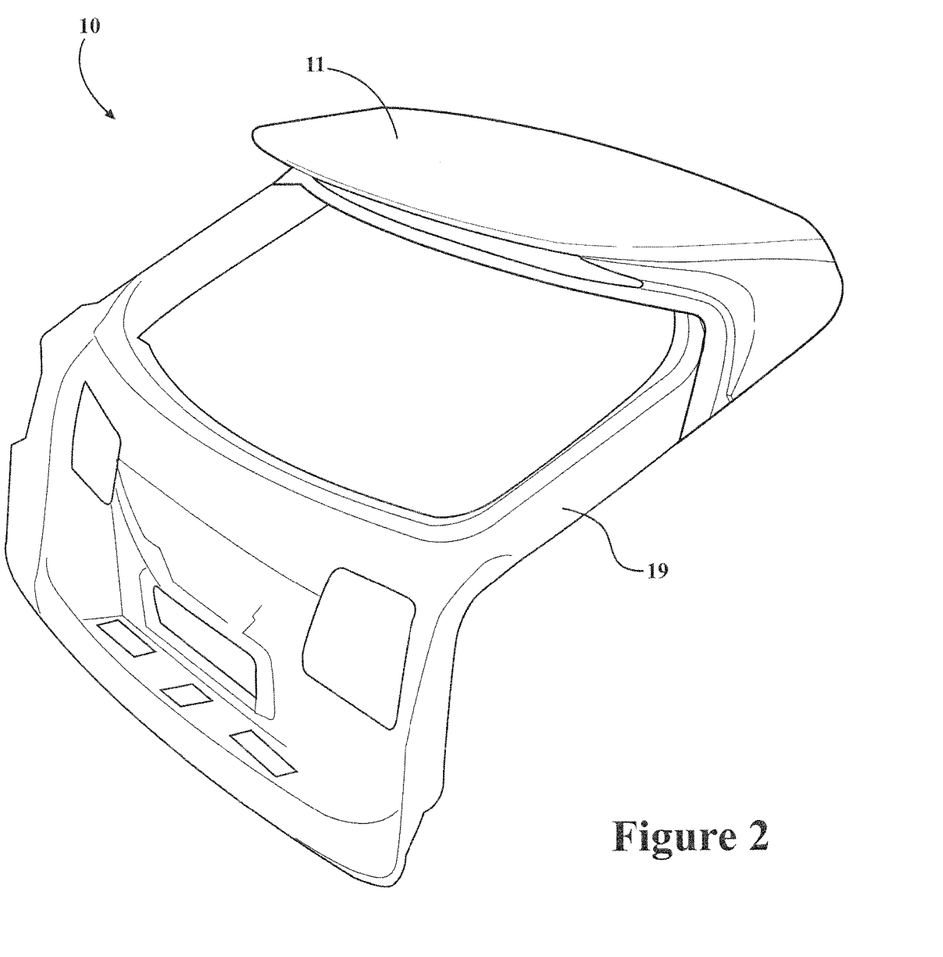
FIG. 2 is a perspective view of the inner panel of a lift gate in accordance with the present invention.
Figure 3:
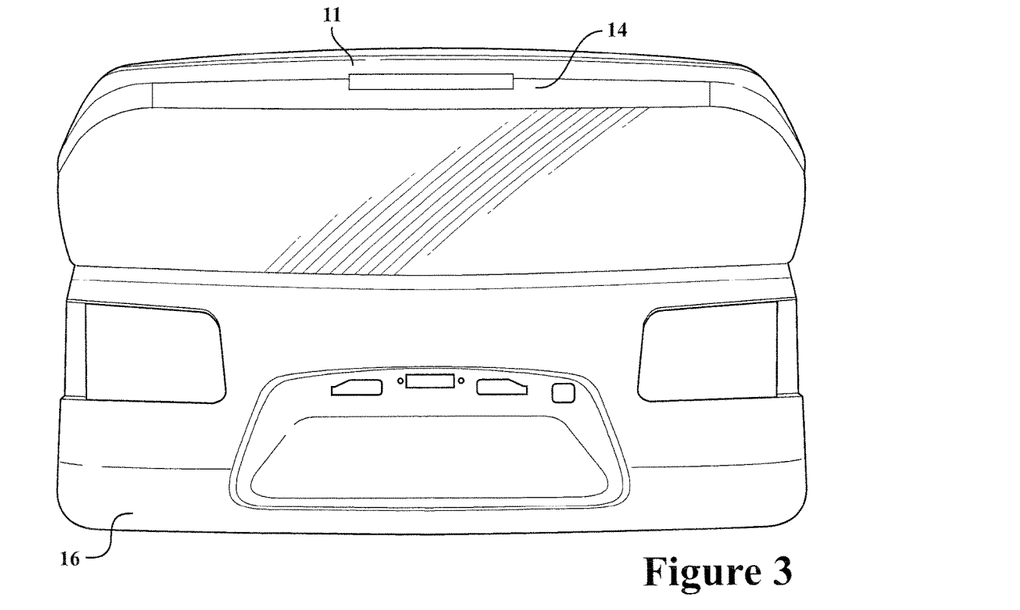
FIG. 3 is a rear plan view of a lift gate having a wiper module assembly attached to a spoiler in accordance with the present invention.
Figure 4:
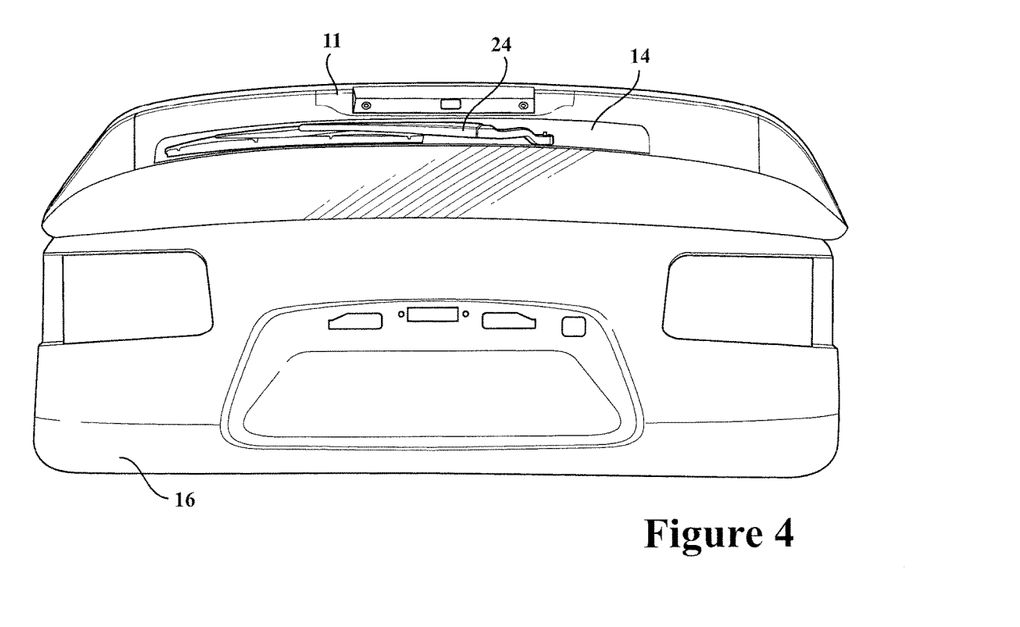
FIG. 4 is an angled rear plan view of a lift gate having a wiper module assembly attached to a spoiler, according to the present invention.
Figure 5:
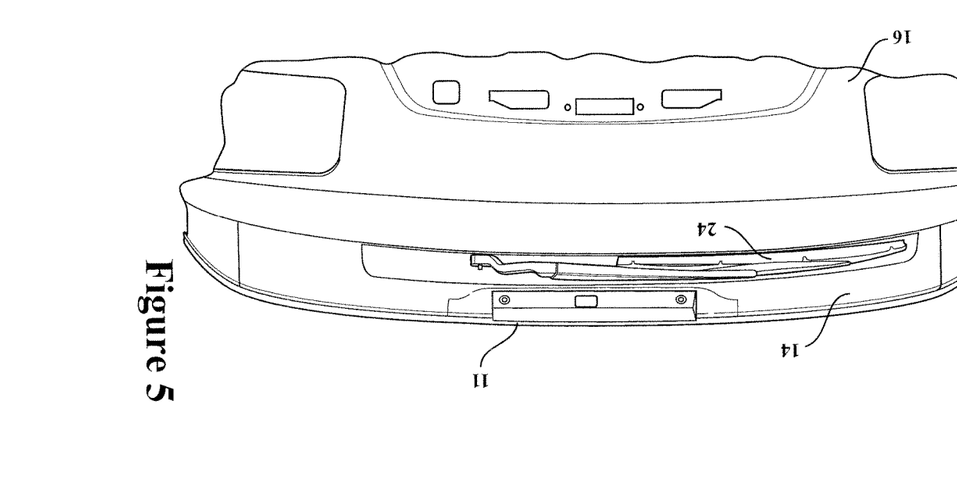
FIG. 5 an enlarged partial angled rear plan view of a lift gate having a wiper module assembly attached to a spoiler, according to the present invention.
Figure 6:
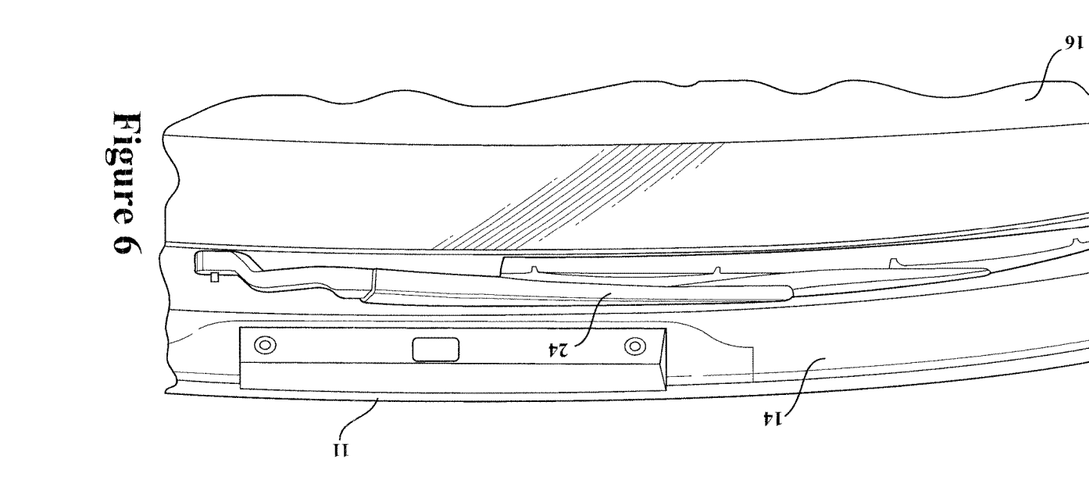
FIG. 6 an enlarged partial angled rear plan view of a lift gate having a wiper module assembly attached to a spoiler, according to the present invention.
Figure 7:
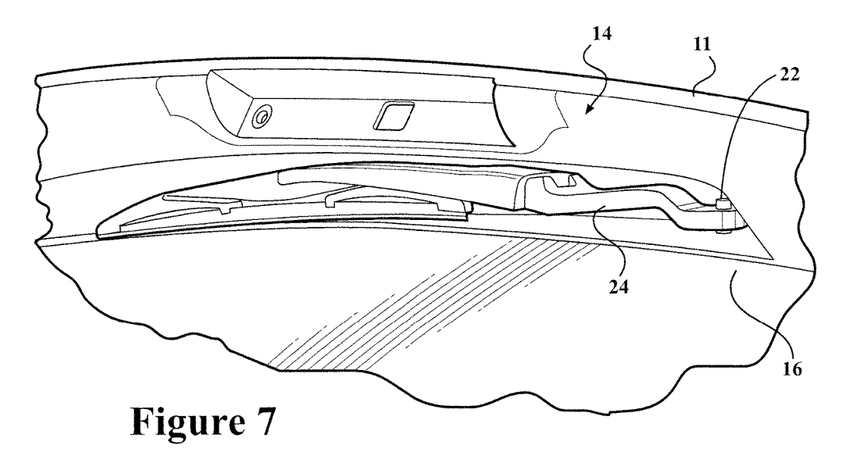
FIG. 7 is a second enlarged partial angled plan view of a lift gate having a wiper module assembly attached to a spoiler, according to the present invention.
Figure 8:
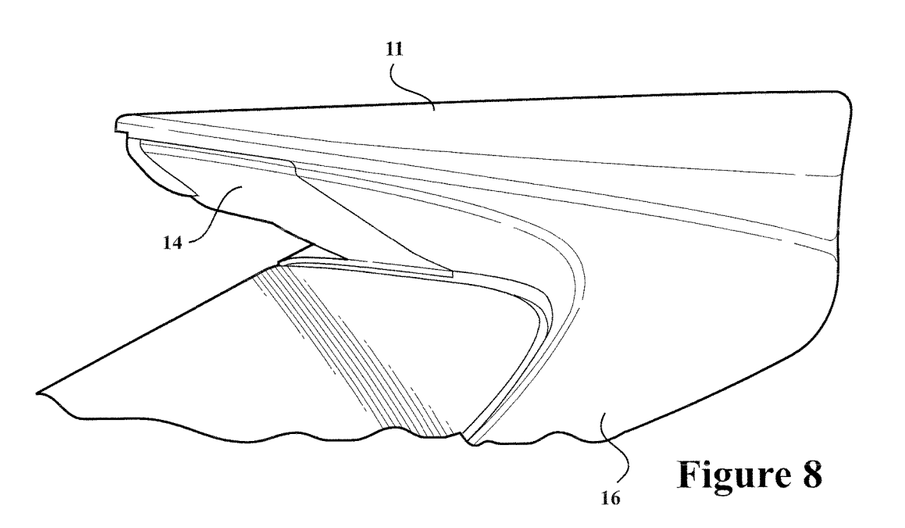
FIG. 8 is an enlarged partial side perspective view of a lift gate having a wiper module assembly attached to a spoiler, according to the present invention.
Figure 9:
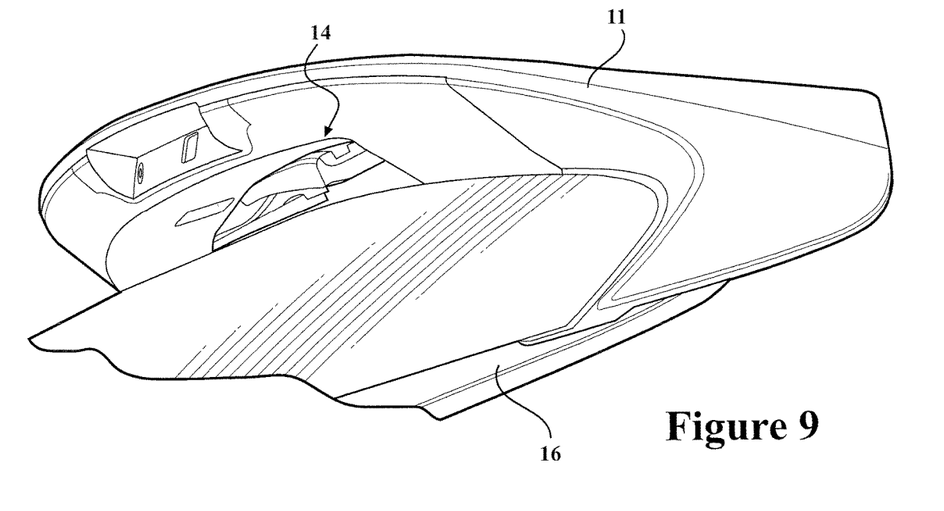
FIG. 9 an enlarged partial side perspective view of a lift gate having a wiper module assembly attached to a spoiler, according to the present invention.
Figure 10:
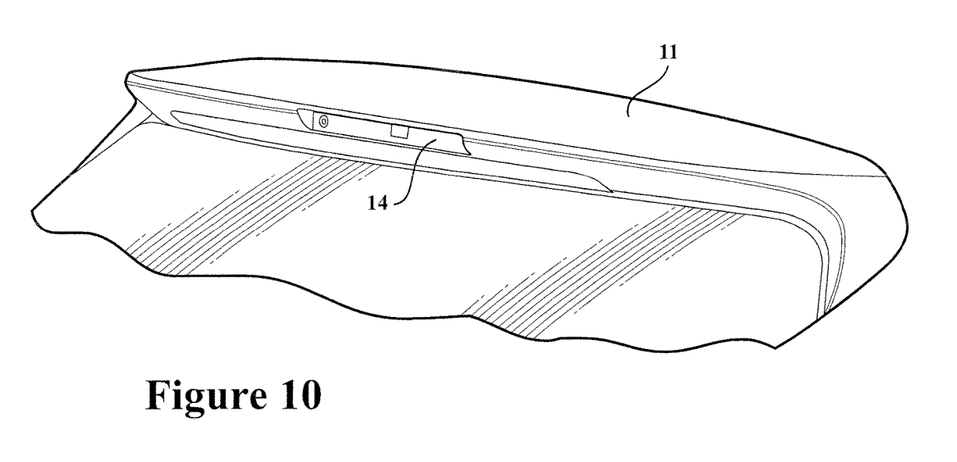
FIG. 10 is an enlarged partial perspective angled view of the lift gate with the wiper module assembly attached to the spoiler, according to the present invention.
Figure 11:
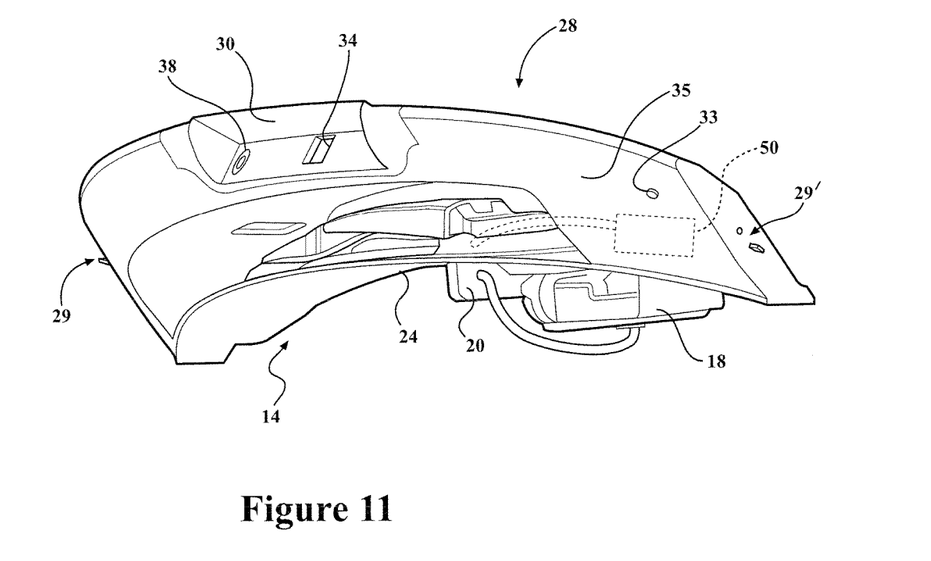
FIG. 11 is a side perspective view of the wiper module assembly.
Figure 12:
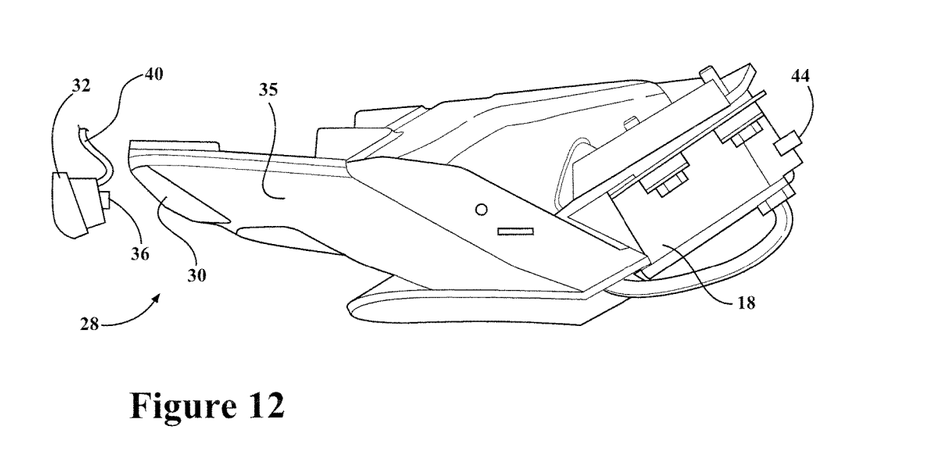
FIG. 12 is a side plan view of the wiper module assembly.
Figure 13:
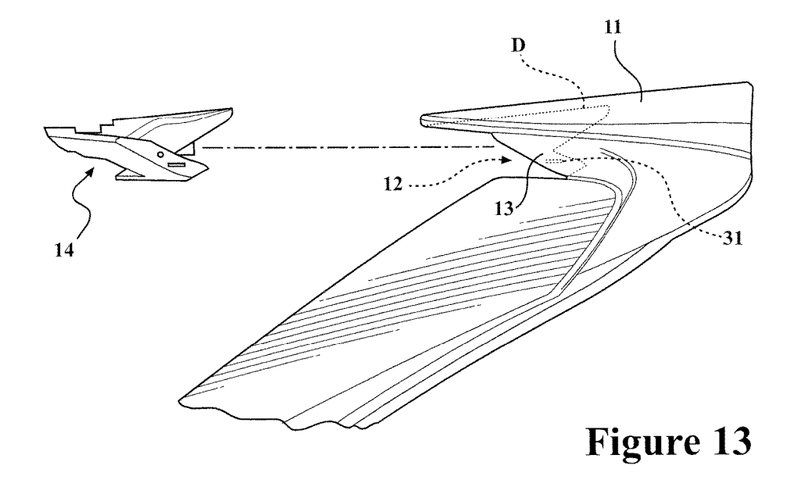
FIG. 13 is an enlarged partial exploded side plan view of the lift gate assembly having the wiper module assembly removed from the spoiler.
Figure 14:
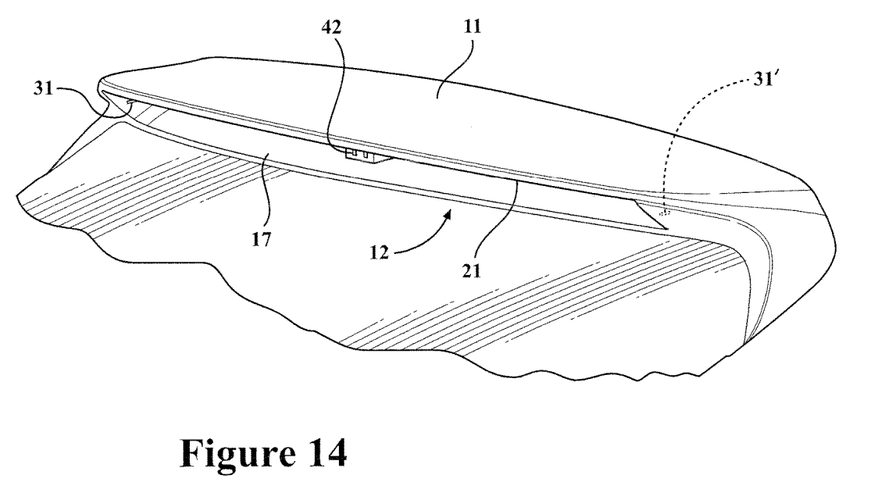
FIG. 14 is an enlarged partial side perspective view of the lift gate having the wiper module assembly removed.
Figure 16:
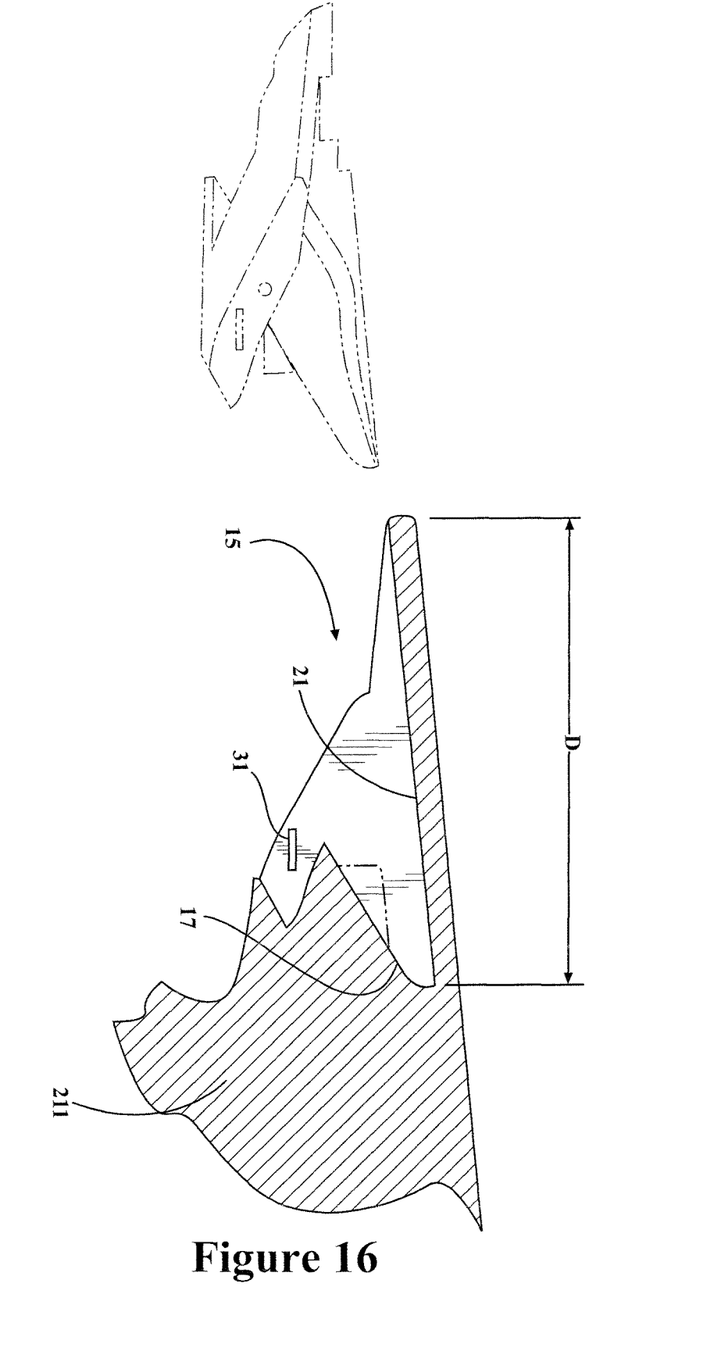
FIG. 16 is a cross-sectional partial plan view of the spoiler and carrier.
Figure 17:
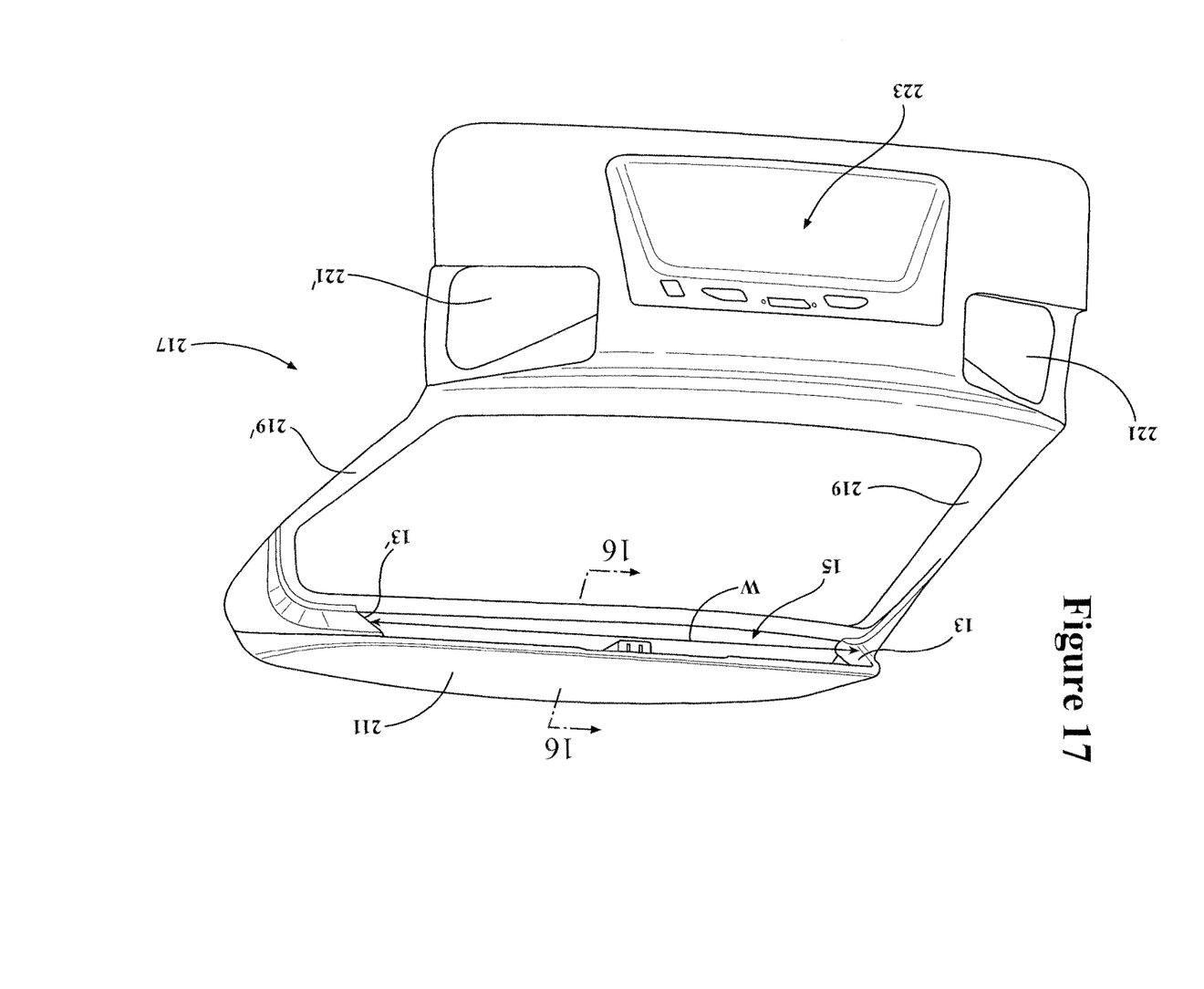
FIG. 17 is an outside perspective view of the outer panel.

The details of the wiper module assembly 14 are shown in FIGS. 11 and 12. The wiper module assembly 14 has a one-piece carrier 28 that is used as a mounting surface and is shaped to aesthetically fit into a cavity 12 of the spoiler 11 when connected to the lift gate 16. The wiper cavity 12 has an opening 15 that defines a width W as shown in FIG. 17. There are also two side walls 13, 13' and an upper wall 21 starting at the opening and extending to a back wall that defines a depth D of the cavity, as shown in FIGS. 16 and 17. The carrier 28 is also described as a wiper cartridge with an exterior surface 35 that spans the width W and a length that spans the depth D of the cavity 12 when the carrier 28 is inserted. The carrier 28 further includes an optional alignment feature, shown as locking tabs 29, 29' on each side of the carrier 28, which are configured to align with and engage a groove and tab aperture, 31, 31' located on two side walls 13, 13' of the cavity 12. The carrier 28 is released by a release mechanism 33 located on the carrier 28 which is configured to release the locking tabs 29, 29' from the respective tab aperture 31, 31' of the cavity 12 to allow the carrier 28 to be removed from the spoiler 11. It is within the scope of this invention for the release mechanism 33 to be a push button, key hole or other type of access. It is also within the scope of this invention for the release mechanism 33 to be located on the spoiler 28.

A wiper motor 18 is mounted to the carrier 28 and also has a drive assembly 20 that is connected to the motor 18. The drive assembly 20 can be a gear or gear train and the drive assembly 20 can be one piece with the wiper motor 18 or can be a separate component connected to the wiper motor 18. A spindle 22 for the wiper extends from the drive assembly 20 and connects to the wiper 24. When the wiper motor 18 is operated, the spindle 22 rotates between two or more positions so that the wiper 24 moves between a retracted position and extended position to wipe the rear window 26.

The cavity 12 has a wiper socket 42 that is configured to receive a wiper plug 44, which extends from the wiper motor 18. The wiper plug 44 and wiper socket 42 provide electrical power from the vehicle to the wiper motor 18. While the present embodiment of the invention describes a wiper plug and wiper socket, it is within the scope of this invention for the two components to be reversed or for some other suitable electrical connection to be made between the motor and the vehicle.

When the wiper module assembly 14 is positioned within the cavity 12, the carrier 28 of the wiper module assembly 14 is shaped to match the contours of the spoiler 11. It is within the scope of this invention for the cavity 12 to be in a different area and not necessarily within the spoiler 11, for example, the cavity can be formed in the lift gate panels. In other embodiments, the carrier 28 would have a different shape to match whatever shape is necessary in order to meet aesthetic design. In accordance with the present embodiment of the invention, the carrier 28 defines a removable module for connection to the cavity 12, wherein the carrier 28 is at least partially hidden from view by the lift gate 16 or the spoiler 11.

It is also within the scope of this invention for the wiper module assembly 14 to include other components. For example, one alternative embodiment of the invention includes a fluid pump 50 mounted to the carrier 28. The fluid pump 50 pump washer fluid that is sprayed either from the carrier 28 or the wiper 24 onto the rear window 26 of the lift gate 16.

Another aspect of the invention involves reducing the number of components and improving the design of the lift gate. In FIGS. 2-15 the lift gate 16 can be formed of metal or lightweight polymeric materials. In particular, the lift gate 16 has an inner panel 19 and an outer panel 17. The outer panel 17 is what is seen when the vehicle is viewed from the exterior. The inner panel 19 forms a frame from which the outer panel 17, rear window 26 and other components are attached. One aspect of the present invention has a molded inner panel 19 that is one piece with the spoiler 11 formed thereon. By providing a single piece molded spoiler 11 and inner panel 19, the number of components is reduced as well as possible problems that can occur due to water, snow or ice getting in between the inner panel and the spoiler, which can damage the wiper module assembly.

The lift gate 16 in the present invention also includes a number of support brackets 46 positioned between the outer panel 17 and inner panel 19 which strengthen the lift gate 16. It is also within the scope of the invention for the outer panel 17 to be formed of a molded polymeric material, which reduces the overall weight of the lift gate 16, which have traditionally been formed of metal sheets and can be very heavy and cumbersome to move. The inner panel 19 also has attached an interior appliqué 48 which completes the interior surface of the lift gate 16.

In another embodiment of the invention, the wiper module assembly 14 includes a center high mount stop lamp (CHMSL) 32 that connects to a recess 30 formed on the carrier 28 of the wiper module assembly 14. The recess 30 has a lock aperture 34 that is configured to receive a tab 36 extending from the CHMSL 32. The lock aperture 34 and tab 36 function to provide a snap fit or locking tab arrangement for the CHMSL 32 into the recess 30 of the wiper module assembly 14. While a lock tab arrangement is described, it is within the scope of this invention for a different type of connection to be utilized, such as fasteners, adhesives or welding. In order to provide power to the CHMSL 32, a connector 38 is formed in the recess 30 and aligns with and receives a plug 40 extending from the CHMSL 32.

Figure 15:
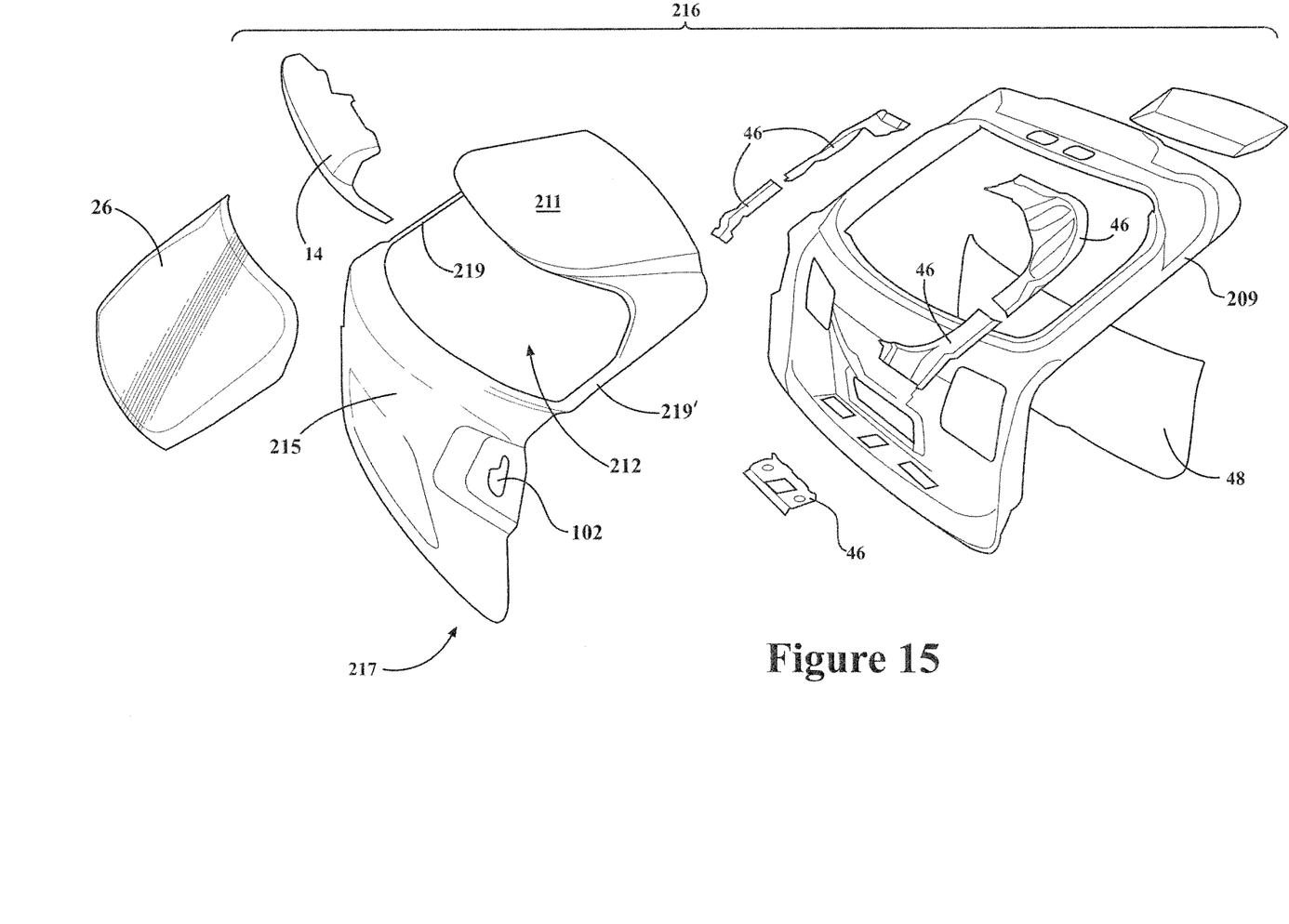
FIG. 15 is an exploded perspective view of a lift gate in accordance with one aspect of the present invention.

Referring to FIGS. 15-17 an alternate embodiment of the invention is shown. Structures in common with the other figures are shown with identical reference numbers. In this embodiment the invention involves reducing the number of components by forming a lift gate 216 of metal or lightweight polymeric materials. In particular, the lift gate 216 has an inner panel 209 and an outer panel 217. The outer panel 217 is what is seen when the vehicle is viewed from the exterior. The inner panel 209 forms a frame from which the outer panel 217 is connected to. In this particular embodiment the outer panel 217 is a one-piece outer panel with a lower portion 215, a spoiler 211 forming the upper portion and two pillars 219, 219' connecting between the lower portion 215, and spoiler 211 to define an aperture 212 for the window 26 to be connected. The lower portion 215, spoiler 217 and pillars 219, 219' are molded as one-piece to form the outer panel 217 of the lift gate 216. The lower portion 215 of the outer panel 217 also includes tail light apertures 221, 221' and release handle aperture 223 formed through the outer panel 217 to allow for the mounting of additional components such as lights, and lock mechanisms through the outer panel 217. Molding the spoiler 211 as one-piece as part of the outer panel 217 reduces the number of components and helps to eliminate water, snow and ice from getting between the inner panel 209 and outer panel 217.

The design of the wiper module assembly 14 provides a removable or serviceable module that eliminates the need for disassembling the entire spoiler 11 from the lift gate 16. Additionally, the present invention reduces the number of components by providing a spoiler 11 that is formed of a one piece component with the inner panel 209. Additionally, the wiper module assembly 14, in alternative embodiments of the invention can include components in addition to the wiper 24 itself. For example, alternate embodiments of the wiper module assembly 14 include a fluid pump 50 for spraying fluid onto the rear window 26 and/or a CHMSL 2 unit that connects directly to the wiper module assembly 14, thus eliminating the need to have the CHMSL connected to a different part of the vehicle that would require more difficult disassembly in order to service the CHMSL.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wiper module assembly for a vehicle lift gate comprising:
    an outer panel of a vehicle lift gate having a spoiler formed as part of said outer panel;
    an inner panel of said lift gate connected to said outer panel;
    a cavity formed as part of said spoiler, wherein the cavity has an opening that defines a width and the cavity has two side walls and an upper wall starting at the opening and extending to a back wall creating a depth of the cavity;
    a carrier defining a wiper cartridge for connection to the cavity, with an exterior surface that spans the width of the cavity and a length of the carrier that spans the depth of the cavity when the carrier is inserted;
    a groove and tab aperture located on the two side walls of the cavity;
    locking tabs on each side of the carrier configured to align with the groove and tab aperture of the cavity;
    a motor connected to said carrier and having a drive assembly driven by the motor; and
    a wiper connected to the drive assembly and configured to move between a retracted position and an extended position.

2. The wiper module assembly for a vehicle lift gate of claim 1 wherein said carrier is a one-piece component.

3. The wiper module assembly for a vehicle lift gate of claim 1 further comprising:
    locking tabs on each side of the carrier configured to align with and engage a groove and tab aperture formed on the side walls of the cavity.

4. The wiper module assembly for a vehicle lift gate of claim 3 further comprising a release mechanism located on the carrier configured to release the locking tabs from the tab aperture of the cavity.

5. The wiper module assembly for the vehicle lift gate of claim 1 wherein the outer panel has a lower portion and two pillars extending between the lower portion and the spoiler to define an aperture in the outer panel.

6. The wiper module assembly for a vehicle lift gate of claim 1 further comprising:
    one or more tail light apertures formed through the outer panel and a release handle aperture formed through the outer panel.

7. The wiper module assembly for a vehicle lift gate of claim 1, wherein said cavity further comprises a wiper socket and said motor has a wiper plug for connecting to said wiper socket in order to provide power to said motor.

8. A wiper module assembly for a vehicle lift gate comprising:
    an outer panel of a vehicle lift gate having a spoiler formed as part of said outer panel;
    an inner panel of said lift gate connected to said outer panel;
    a cavity formed as part of said spoiler, wherein the cavity has an opening that defines a width and the cavity has two side walls and an upper wall starting at the opening and extending to a back wall creating a depth of the cavity;
    a carrier defining a wiper cartridge connectable to the cavity of the spoiler, with an exterior surface that spans the width of the cavity and a length of the carrier that spans the depth of the cavity when the carrier is inserted;
    a groove and tab aperture located on the two side walls of the cavity;
    locking tabs on each side of the carrier configured to align with the groove and tab aperture of the cavity;
    a motor connected to said carrier and having a drive assembly driven by the motor;
    a spindle rotatably extending from and driven by the drive assembly; and
    a wiper connected to the spindle and configured to move between a retracted position and an extended position.

9. The wiper module assembly for a vehicle lift gate of claim 8 wherein the carrier is a one piece component.

10. The wiper module assembly for a vehicle lift gate of claim 8 further comprising:
    locking tabs on each side of the carrier configured to align with and engage a groove and tab aperture formed on the side walls of the cavity.

11. The wiper module assembly for a vehicle lift gate of claim 10 further comprising further comprising a release mechanism located on the carrier configured to release the locking tabs from the tab aperture of the cavity.

12. The wiper module assembly for the vehicle lift gate of claim 8, wherein the outer panel has a lower portion and two pillars extending between the lower portion and the spoiler to define an aperture in the outer panel.

13. The wiper module assembly for a vehicle lift gate of claim 8 further comprising:
    one or more tail light apertures formed through the outer panel and a release handle aperture formed through the outer panel.

14. The wiper module assembly for a vehicle lift gate of claim 8, wherein said cavity further comprises a wiper socket and said motor has a wiper plug for connecting to said wiper socket in order to provide power to said motor.

15. The wiper module assembly for a vehicle lift gate of claim 8 further comprising:
    a width defined by an opening of the cavity and depth defined by an upper wall of the cavity; and
    wherein the carrier further includes an exterior surface that spans the width of the cavity.

16. A wiper module assembly for a vehicle lift gate comprising:
    an outer panel of a vehicle lift gate having a spoiler formed as part of said outer panel, wherein the outer panel has a lower portion and two pillars extending between the lower portion and the spoiler to define an aperture in the outer panel;
    an inner panel of said lift gate connected to said outer panel;
    a cavity formed as part of said spoiler, wherein the cavity has an opening that defines a width and the cavity has two side walls and an upper wall starting at the opening and extending to a back wall creating a depth of the cavity;

a carrier defining a wiper cartridge for connection to the cavity, with an exterior surface that spans the width of the cavity and a length of the carrier that spans the depth of the cavity when the carrier is inserted;

a groove and tab aperture located on the two side walls of the cavity;

locking tabs on each side of the carrier configured to align with the groove and tab aperture of the cavity;

a motor connected to said carrier and having a drive assembly driven by the motor; and a wiper connected to the drive assembly and configured to move between a retracted position and an extended position.

17. The wiper module assembly for a vehicle lift gate of claim 16 further comprising:

one or more tail light apertures in the outer panel and a release handle aperture formed through the outer panel.

18. The wiper module assembly for a vehicle lift gate of claim 16, wherein said cavity further comprises a wiper socket and said motor has a wiper plug for connecting to said wiper socket in order to provide power to said motor.

19. The wiper module assembly for a vehicle lift gate of claim 16 further comprising:

locking tabs on each side of the carrier configured to align with and engage a groove and tab aperture formed on the side walls of the cavity; and a release mechanism located on the carrier configured to release the locking tabs from the tab aperture of the cavity.

\* \* \* \* \*